Patented Mar. 24, 1953

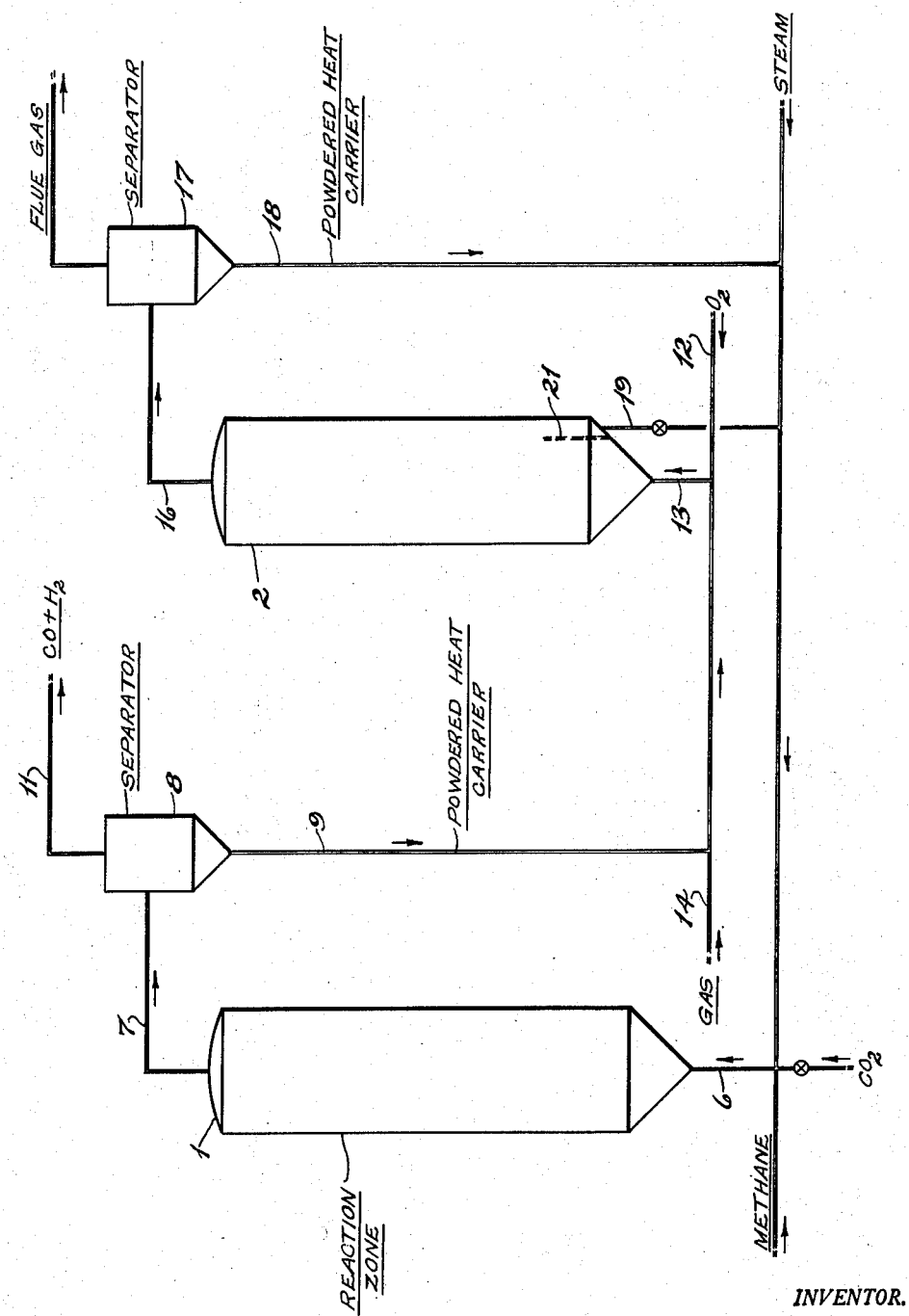

2,632,690

UNITED STATES PATENT OFFICE 2,632,690

PRODUCTION OF CARBON MONOXIDE AND HYDROGEN FROM HYDROCARBONS

Harold V. Atwell, Beacon, N. Y., assignor to The Texas Company, New York, N. Y., a corporation of Delaware Application January 2, 1948, Serial No. 66

2 Claims. (Cl. 23—212)

This invention relates to a process for the production of carbon monoxide and hydrogen by the reaction of a hydrocarbon with an oxidizing agent. In one of its more limited aspects it relates to a process for the production of carbon monoxide and hydrogen by the interaction of steam, carbon dioxide, and a hydrocarbon. A gaseous hydrocarbon, for example, methane, is suitable as the hydrocarbon. The mixture of carbon monoxide and hydrogen produced by the reaction is especially suited for the synthesis of hydrocarbons useful as motor fuels.

This application is a continuation-in-part of my copending application for U. S. patent, Serial Number 514,769, filed December 18, 1943, now U. S. Patent No. 2,448,290.

The synthesis of hydrocarbons suitable for use as motor fuels from carbon monoxide and hydrogen is becoming increasingly important in the United States. This process offers a means of converting large gas reserves comprising chiefly methane, to gasoline and other high quality motor fuels. Also of importance in this connection is the efficient generation of carbon monoxide and hydrogen from methane and other low grade hydrocarbons.

It is known that hydrocarbons may be converted to a mixture of carbon monoxide and hydrogen useful for hydrocarbon synthesis by reaction with an oxidizing agent under controlled conditions. Among the reactions useful for preparation of synthesis gas are the interaction of methane with steam, with carbon dioxide, or with a mixture of steam and carbon dioxide. The reaction takes place at a temperature above about 1500° F. and may be catalyzed by various materials effective for promotion of the reaction including nickel, cobalt, and alumina. Nickel or cobalt are preferably supported on a suitable carrier or supporting material.

The reaction between a hydrocarbon and steam, hydrocarbon and carbon dioxide, or between a hydrocarbon and a mixture of steam and carbon dioxide is endothermic and requires supply of a considerable quantity of heat to the reaction. It has previously been proposed to supply the endothermic heat of reaction by transfer of heat through metal, as tubes. Other methods involve heating the catalyst either continuously or intermittently to a temperature considerably in excess of the reaction temperature and taking advantage of the heat capactiy of the catalyst to supply heat to the reaction as the catalyst is cooled.

The present invention provides an improved method of supplying heat to the reaction which possesses numerous advantages over the prior art processes. By the process of this invention heat is supplied to the catalyst and reactants continuously within the reaction zone without troublesome indirect heat transfer. This is accomplished, as in my copending patent application above referred to, by circulation of a powdered heat carrier through the catalyst in the reaction zone. The heat carrier is entrained in the reactants and resulting reaction products.

Heat is supplied to the heat carrier exteriorly of the reaction zone. A suitable method of heating the heat carrier is by combustion of a carbonaceous material accumulated on the heat carrier during passage through the conversion zone. Additional heat may be supplied to the heat carrier by combustion of fuel, for example, fuel gas or oil from any suitable source.

In the process of my copending application, Serial Number 514,769, now U. S. Patent No. 2,448,290, heat may be supplied to a reaction zone containing the catalyst in stationary masses provided with passages for the flow of reactants and entrained powdered heat carrier therethrough. In accordance with the present process, the catalyst is in the form of finely divided particulate solid in a fluidized fixed bed. The powdered heat carrier passes through the fluidized catalyst effecting extremely rapid direct transfer of heat from the heat carrier to both the reactants and the catalyst. This results in uniform temperatures throughout the reaction zone.

By the term "fluidized fixed bed" as used throughout this disclosure is meant a bed of particulate catalyst in which the catalyst particles are fluidized or agitated by the flow of reactants therethrough. The agitation imparts a limited movement or hopping motion to the catalyst particles, giving the mass of catalyst the appearance of a boiling liquid. The bed of catalyst is fixed in the sense that the catalyst is not suspended in the reactants and carried away in the effluent stream to any appreciable extent, and catalyst is not withdrawn from the bed nor added thereto except as required to make up unavoidable losses. A small amount of the catalyst may be, and usually is, entrained in the effluent as a fine dust resulting from decrepitation of the catalyst. A portion or all of the fine catalyst carried away in the effluent stream may be returned to the reaction zone. Fresh catalyst is added at a rate sufficient to replenish catalyst lost from the system by mechanical disintegration and entrainment.

The use of two fluidized catalysts, one of which is in a fixed bed and the other entrained in the reactants and reaction products is disclosed in my copending application Serial Number 533,901, filed May 3, 1944, now U. S. Patent No. 2,443,673.

An important advantage of the present invention resides in the fact that it obviates the necessity of heating the catalyst to a temperature above the reaction temperature to supply the heat of reaction. The heat carrier itself may be of any suitable refractory capable of withstanding temperatures substantially in excess of the reaction temperature.

More specifically, the invention involves reacting a gaseous hydrocarbon such as methane with carbon dioxide and steam in the presence of a powdered material, such as alumina, magnesia, and diatomaceous earth, etc., at a temperature in the range 1500 to 2500° F., and preferably at a temperature about 1800 to 2000° F. The reactant gases are charged in the proportion of about 4 mols methane, 3 mols steam and 1 mol carbon dioxide.

Under these conditions the methane reacts with steam and carbon dioxide to form a gas containing carbon monoxide and hydrogen in about the proportion of 1 mol carbon monoxide to 2 mols of hydrogen, and therefore, suitable as a synthesis gas for the subsequent conversion into hydrocarbons having 2 or more carbon atoms per molecule.

It is also contemplated that the reaction conditions and composition of the charge to the conversion reaction may vary from the foregoing; for example, it may be desired to modify the conditions of reaction so as to produce a synthesis gas containing carbon monoxide and hydrogen in proportions suitable for the production of oxygenated hydrocarbons.

The catalyst utilized in the form of a fluidized fixed bed may suitably comprise particles of alumina impregnated with metallic nickel, or mixtures of nickel and manganese which are capable of promoting the reaction between the hydrocarbon and an oxidizing agent. Alumina or bauxite may be used, per se. The catalyst may comprise a metal effective for promoting the reaction associated with a carrier material other than alumina, which in itself is an active catalyst. Other carrier materials which are suitable for use include silica-alumina gel, clays, and the like.

The catalyst is in the form of finely divided discrete particles having a particle size or average diameter within the range of 20 microns to 1 millimeter. Preferably, the average particle size of the catalyst is within the range of from about 40 to about 60 microns.

The powdered heat carrier has an average particle size less than the average particle size of the catalyst. It will be evident that the choice of particle size for the heat carrier may depend to a considerable extent upon the choice of particle size of the catalyst, vapor velocities, etc. In general, it is advantageous to use a heat carrier having a particle size less than about 50 microns. The lower limit of particle size is dependent only upon the efficiency of the recovery equipment. Insofar as the process is concerned an impalpable powder is a highly efficient heat transfer medium.

The products of reaction and the used carrier are continuously removed from the conversion zone. The used carrier having some carbonaceous material disposed thereon is passed to a combustion zone operated at a temperature in the range about 2000 to 2500° F. wherein it is subjected to contact with air or combustion gases so as to effect combustion of the carbon and also raise the carrier material to an elevated temperature.

The products of combustion and the reheated carrier powder are continuously withdrawn from the combustion zone and the reheated powder recycled to the conversion zone.

The hot products of combustion may be used to preheat the methane and steam, and if desired may be used also to preheat the air or combustion gases passing to the combustion zone. The hot products of combustion, after separation of the heated heat carrier may also be used to preheat the powdered heat carrier separated from the effluent stream prior to introduction of the heat carrier into the combustion zone.

An important advantage of the process resides in the employment of a continuous method of flow. A further advantage involves maintaining uniform reaction conditions within the conversion zone thereby producing a product of uniform composition, namely carbon monoxide and hydrogen, in the desired molecular proportions. A still further advantage involves the production of a synthesis gas which is free from nitrogen.

An important feature of the invention has to do with circulation of the heat carrier material in finely divided form through the conversion and combustion zones while suspended in the streams of gaseous reactants passing through these zones. In this way the solid material is fluidized by the streams of gas thereby expediting its movement through the system. By operating in this manner it is possible to take advantage of the heat liberated in the combustion zone to supply the heat required in carrying out the endothermic reaction in the conversion zone.

In order to describe the invention, reference will now be made to the accompanying drawing showing a flow diagram illustrative of one method of practicing the process.

The numeral 1 refers to a reaction zone in the form of a vertical vessel or tower wherein the conversion of methane to carbon monoxide and hydrogen is effected. The numeral 2 refers to a separate but similar type of vessel employed as a combustion zone wherein the carbonaceous material is burned from the used carrier material so as to restore it to a highly heated condition.

As indicated in the drawing, methane and steam, and if desired, carbon dioxide, are supplied to the reaction zone 1 through a pipe 6 entering at the bottom of the reaction zone. Powdered heat carrier is introduced through pipe 6 and is conveniently handled by propulsion with the steam as will be brought out hereinafter.

The heat carrier is introduced to the reaction zone in the proper proportions to maintain the desired reaction temperature and to supply the heat requirements of the reaction in excess of the heat supplied by the reactants themselves. The reactants may, of course, be preheated to any desired extent and thus supply a portion of the heat required for the reaction. The velocity of the gaseous reactants is adjusted so as to carry the powdered heat carrier into the vessel 1 and entrain it in the stream of reactants and resulting reaction products flowing through the reaction zone.

The powdered heat carrier is preheated to a temperature of at least 1800 to 2000° F. so as to effect the reaction between methane, steam and carbon dioxide, which reaction may be carried out under pressures ranging from atmospheric to 200 pounds per square inch gauge.

The gaseous products of reaction containing entrained powdered heat carrier are continuously drawn from the top of the reaction zone 1 through a pipe 7 leading to a separator 8. Separator 8 may be of the cyclone type, adapted to effect separation of the entrained powder from the gases. A plurality of separators may be used if desired. The separator may be of the centrifugal or filter type or an electrical precipitator may be used. Obviously, a combination of different type separators may be employed.

The separated powder is continuously drawn from the bottom of the separator through a pipe 9.

The gaseous products containing carbon monoxide and hydrogen are discharged from the top of the separator through a pipe 11. The discharged gas stream may be subjected to any desired type of treatment to effect further purification. For example, it may be scrubbed with a suitable chemical agent to effect removal of sulfur compounds. It may also be passed through an absorption zone to effect removal of residual carbon dioxide after which it is suitable as a synthesis gas.

Air or other oxygen-containing gas may be introduced from pipe 12 to the combustion zone 2 via pipe 13 at the bottom of the combustion zone. The powdered heat carrier leaving separator 8 via conduit 9 is also introduced to the combustion zone through pipe 13. If desired, a combustible fuel, preferably a gaseous fuel, such as a gaseous hydrocarbon, may be introduced to the combustion zone via pipe 13 from fuel supply pipe 14. Either the oxygen-containing gas, the fuel gas, or a mixture of the two may be utilized to force the solid powder from the pipe 9 through pipe 13 into the combustion zone. As illustrated in the drawing, the powdered heat carrier from pipe 9 is carried to the point of injection into the combustion zone by gas from pipe 14.

The combustion zone, as previously mentioned, is maintained under conditions adapted to burn carbonaceous material deposited on the powdered heat carrier and fuel introduced from an external source.

The products of combustion are drawn off the top of combustion zone 2 through a pipe 16 leading to a separator 17 wherein suspended powder is separated from the flue gas.

The flue gas resulting from the combustion of carbonaceous material in the combustion zone 2 is discharged from separator 17. This flue gas may be treated if desired to effect removal of carbon dioxide therefrom for use as feed to the reaction zone.

The separated powder preheated to the desired elevated temperature is drawn from the bottom of the separator 17 through pipe 18.

A substantial portion of the powder may be withdrawn from the combustion zone through conduit 19 from a point near the bottom of the combustion zone. Withdrawal of the powdered heat carrier through the conduit 19 may be facilitated by a partition 21 within the combustion zone providing a trough in which the powdered heat carrier is accumulated. The powdered heat carrier withdrawn from the combustion zone either via pipe 18 or conduit 19 is preheated to the desired elevated temperature considerably above the reaction temperature and is returned to the reaction zone through line 6. This may be conveniently provided for by injecting the powdered heat carrier with the incoming steam as illustrated in the drawing.

Mention has been made of charging methane to the reaction zone. However, it is contemplated that other hydrocarbons, for example, ethane, propane, butane, natural gas, or other mixtures of gaseous hydrocarbons, may also be used. Heavier hydrocarbons, for example, reduced crude, may be utilized as the hydrocarbon reactant.

It is contemplated that in order to accomplish reheating in the smallest possible space and in the shortest time, a heat carrier capable of catalyzing surface combustion be used.

Obviously many modifications and variations of the invention as set forth above may be made without departing from the spirit and scope thereof and therefore only such limitations should be imposed as are indicated in the appended claims.

I claim:

1. In a process for the production of a mixture of carbon monoxide and hydrogen wherein a gaseous hydrocarbon and a gas selected from the group consisting of steam and carbon dioxide undergo endothermic reaction to form carbon monoxide and hydrogen, the improvement which comprises passing a stream of the reactants upwardly through a reaction zone maintained at reaction temperature into contact with a substantially nontransitory mass of finely divided particulate solid catalyst effective for conversion of the reactants to carbon monoxide and hydrogen with sufficient velocity to maintain said catalyst particles in highly agitated condition but without substantial entrainment of said catalyst particles from the reaction zone; introducing with said reactants into the reaction zone at an elevated temperature substantially above the reaction temperature and substantially above the catalyst temperature a finely divided powdered inert solid heat carrier having an average particle size less than the average particle size of the catalyst such that the heat carrier is substantially completely entrained in the reactants and resulting reaction products; withdrawing from the reaction zone a gaseous effluent stream comprising hydrogen and carbon monoxide containing said powdered heat carrier entrained therein substantially free from catalyst; separating said heat carrier from said effluent stream; passing the separated powdered heat carrier through a heating zone; heating the heat carrier in the heating zone to the aforesaid temperature; withdrawing heated powdered heat carrier from the heating zone; and supplying said heat carrier at said elevated temperature to the reactant stream entering the conversion zone.

2. In a process for the production of a mixture of carbon monoxide and hydrogen wherein a mixture of methane, steam, and carbon dioxide undergo endothermic reaction to form carbon monoxide and hydrogen, the improvement which comprises passing said mixture upwardly through a reaction zone maintained at reaction temperature into contact with a substantially non-transitory mass of finely divided particulate solid catalyst effective for conversion of the reactants to carbon monoxide and hydrogen with sufficient velocity to maintain said catalyst particles in a highly agitated condition but without substantial entrainment of said catalyst particles from the reaction zone; introducing with said reactants into the reaction zone at an elevated temperature substantially above the reaction temperature and substantially above the catalyst temperature a finely divided powdered inert solid heat carrier having an average particle size less than the average particle size of the catalyst such that the heat carrier is substantially completely entrained in the reactants and resulting reaction products; withdrawing from the reaction zone a gaseous effluent stream comprising hydrogen and carbon monoxide containing said powdered heat carrier entrained therein substantially free from catalyst; separating said heat carrier from said effluent stream; passing the separated powdered heat carrier through a heating zone; heating the heat carrier in the heating zone to the aforesaid temperature; withdrawing heated powdered heat carrier from the heating zone; and supplying said heat carrier at said elevated temperature to the reactant stream entering the conversion zone.

HAROLD V. ATWELL.

REFERENCES CITED

The following references are of record in the file of this patent:

UNITED STATES PATENTS

| Number | Name | Date |
| --- | --- | --- |
| 2,396,109 | Martin | Mar. 5, 1946 |
| 2,425,754 | Murphree et al. | Aug. 19, 1947 |
| 2,448,290 | Atwell | Aug. 31, 1948 |
| 2,455,915 | Borcherding | Dec. 14, 1948 |
| 2,468,521 | Sweetser et al. | Apr. 26, 1949 |

OTHER REFERENCES

Riegel, "Industrial Chemistry," 3rd edition, page 273.